(12) United States Patent
Hofmann et al.

(10) Patent No.: US 8,711,456 B2
(45) Date of Patent: Apr. 29, 2014

(54) DEFLECTION DEVICE FOR A SCANNER WITH LISSAJOUS SCANNING

(75) Inventors: Ulrich Hofmann, Itzehoe (DE); Manfred Weiss, Itzehoe (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 54 days.

(21) Appl. No.: 13/494,463

(22) Filed: Jun. 12, 2012

(65) Prior Publication Data

US 2012/0320379 A1 Dec. 20, 2012

(30) Foreign Application Priority Data

Jun. 15, 2011 (DE) .......... 10 2011 104 556

(51) Int. Cl.
*G02B 26/08* (2006.01)
(52) U.S. Cl.
USPC ...................................... 359/200.8
(58) Field of Classification Search
USPC ........... 359/200.8, 212.1–214.1, 223.1–226.1
See application file for complete search history.

(56) References Cited

U.S. PATENT DOCUMENTS

| | | | |
|---|---|---|---|
| 6,838,738 B1 | 1/2005 | Costello et al. | |
| 2006/0076417 A1 | 4/2006 | Massieu | |
| 2008/0143451 A1* | 6/2008 | Sprague et al. | ............... 359/226 |
| 2010/0237737 A1 | 9/2010 | He et al. | |
| 2012/0320379 A1 | 12/2012 | Hofmann et al. | |

FOREIGN PATENT DOCUMENTS

| | | |
|---|---|---|
| DE | 102007058239 A1 | 6/2009 |
| EP | 1419411 B1 | 5/2004 |

OTHER PUBLICATIONS

Hofmann, Ulrich et al., "Wafer-level vacuum packaged micro-scanning mirrors for compact laser projection displays", Proc. of SPIE, 2008, vol. 6887, 688706-1 to 688706-15.

\* cited by examiner

*Primary Examiner* — Euncha Cherry
(74) *Attorney, Agent, or Firm* — Faegre Baker Daniels LLP

(57) ABSTRACT

A deflection device for a scanner with Lissajous scanning includes a micromirror that oscillates in at least two deflection axes and that includes a frame and a mirror plate that is movably arranged via a suspension mount. The deflection device also includes a control device for generating control signals for a resonant operation of the micromirror in the at least two deflection axes. The suspension mount includes at least one spring connected at one end to the mirror plate and at the other end to the frame. The frequencies of the control signals for the resonant operation of the micromirror are substantially equal in the at least two deflection axes, but differ at least in terms of the predefined scanning repetition rate. The levels of the resonance frequencies of the deflection axes and control signals are determined by a predefined scanning resolution and a predefined scanning repetition rate.

17 Claims, 2 Drawing Sheets

DEFLECTION DEVICE FOR A SCANNER WITH LISSAJOUS SCANNING

CROSS-REFERENCE TO RELATED APPLICATION

This application claims priority to German Application No. 10 2011 104 556.6, filed Jun. 15, 2011, which is herein incorporated by reference in its entirety.

TECHNICAL FIELD

The invention relates to a deflection device for a scanner with Lissajous scanning according to the preamble of the main claim.

BACKGROUND

Scanners with micromirrors (MEMS scanner) frequently consist of a mirror plate, suspended by springs so as to be movable in one or more axes, which plate is driven by an electrostatic, electromagnetic, thermal, or piezoelectric transfer of force. Laser scanners of this type are used in the field of measurement engineering, for example, in microscopy, in optical coherence tomography, in light barriers, in distance measurement, in profilometers, in fingerprint sensors, etc., for example, but also in consumer applications such as laser video projectors, mobile telephones, laptops and MP3 players.

One very advantageous type of laser projection is based upon resonant operation of the MEMS scanner, because in this case a favorable amplification of the mirror oscillation amplitude can be exploited with simultaneously low power consumption. This applies to both single-axis and multiple-axis MEMS scanners.

One particularly advantageous configuration of such a resonant MEMS scanner provides for operation of the actuator at diminished pressure (vacuum), because this allows damping to be very substantially reduced. This can be exploited to allow the scanner to be operated at minimal power consumption, which is highly significant for all mobile applications (mobile telephone, MP3 players, etc.). With low damping, significantly higher resonance amplitudes of the scanner can be achieved than with conventional resonators operated at atmospheric pressure. Advantages of MEMS laser scanners operated in a vacuum over non-packaged scanners are: greater achievable scanning angles, lower power consumption by several orders of magnitude, higher usable scanning frequencies, lower drive voltages (with electrostatic or piezoelectric actuators).

To generate a vacuum of this type for each of the scanners, which are customarily produced as a plurality on silicon wafers, the scanners can be encapsulated with a hermetic seal inside the wafer laminate, in other words, before being separated into chips, by bonding one glass wafer to the front and bonding a second wafer to the back against the MEMS wafer. A getter encapsulated within the cavities produced in this manner, e.g., a titanium layer, which is deposited on the rear wafer, can chemically bind the majority of encapsulated gas molecules by activation at the appropriate temperature, thereby enabling a minimal gas pressure, which is limited essentially only by the diffusion of natural helium contained in the ambient air back through the glass cover, which is permeable to helium. In the end, this results in an establishment in the cavity of the natural helium partial pressure.

As was already mentioned above, vacuum packaged resonant MEMS laser scanners of this type are of particular interest for mobile laser projection displays in mobile telephones, in which the main goal (for the purpose of the longest possible projection playback time, as is necessary, for example, for playing back movies) is to require that the lowest possible amount of power consumption be reserved for the scanner. Although most implementations of such MEMS-based laser projection displays have heretofore involved a raster-type scanning method, in which one biaxial scanner or two uniaxial scanners arranged in a row are equipped with both a resonantly and a non-resonantly operated scanning axis, advantageous power-saving operation using a vacuum packaged MEMS scanner can be achieved only with the resonant operation of both scanning axes. As a consequence, this results in a Lissajous-type scanning method, in which the pixels generally are not read out and projected from the image memory in the sequence in which they arrive in the image memory.

Because the goal with laser projection displays, particularly for applications in the field of consumer products, is to devise extremely economical systems, the smallest possible component must be devised, while maintaining all other optical/electrical/mechanical requirements. The smaller the component (of the MEMS scanner chip), the more components will fit on one silicon wafer, and therefore, the more economically the component can be manufactured. For this reason, it is expedient to accommodate both scanning axes on only one chip. Conventional 2-D scanner chips are equipped with a mirror plate for this purpose, which is movably suspended in a second frame, which is also movably suspended. This arrangement is frequently identified by the technical term "gimbal mounted scanner", and corresponds approximately to the term "gimbal suspension". The two scanning axes are oriented orthogonally to one another. The gimbal assembly allows the set movements of both axes to be generally effectively isolated from one another. This means that each axis can be operated separately, largely without influence by the operation of the respectively other axis. Because a laser projection display generally processes the image data in a sequential line orientation, there ordinarily is a fast axis, which effects the horizontal deflection ("line sweep"), and a scanning axis, which generates the vertical deflection at a lower frequency. Therefore, the inner suspension of the mirror is ordinarily designed such that the resonance frequency lies between 16 kHz and 32 kHz, whereas the frame that surrounds the mirror forms the slow scanning axis, and has a substantially lower resonance frequency ("Wafer-level vacuum packed micro-scanning mirror for compact laser projection displays", PROC. SPIE, 2008, Vol. 6887, 688706-1 to -15).

However, there are critical disadvantages to this gimbal-suspended, biaxial, resonantly operated gimbal scanner.

1. As a result of the movable frame which surrounds the mirror plate, the space required by the scanner is necessarily much greater than for the mirror plate with its suspension mounts alone. This circumstance is especially problematic in the case of scanners for very high resolution, because high resolution for the scanner means that a very large scanning angle is required, which can in turn be realized only by means of long suspension mounts, due to the mechanical stress in the suspension. The surrounding gimbal must also be correspondingly large in design. Therefore, the gimbal scanner may be a design that is too costly for the application.

2. The requirement of high resolution results in both high oscillation amplitudes and always a very high scanning frequency requirement for the fast axis. Typically, frequencies greater than 30 kHz are necessary for high-resolution Lissajous projection. The large scanning angles with such high scanning frequencies are equivalent to high occurring rotational accelerations, and, as a result of the maintenance of angular momentum, frequently result in a substantial mechanical overcoupling to the surrounding movable frame: The rapid rotational movement of the inner mirror axis transmits so much restoring moment to the gimbal structure that said structure resonates vertically in the opposite direction, i.e., in phase opposition. As a result of this resonance, the movable drive electrodes of the gimbal are also raised out of their set position and, when acted upon by the drive potential, generate a different electrostatic torque than was actually planned. Frequently, this mechanical/electrical overcoupling mechanism results in unstable behavior of the actuator and a deviation of the movement from the set function, which can be detected only imprecisely by the position sensing system, with the result that image interference becomes visible. The amplitude of this undesirable overcoupling movement of the gimbal is greater, the lower the moment of inertia of the gimbal is. Therefore, in order to keep the amplitude negligibly low, a gimbal of sufficiently large diameter, large mass and/or high moment of inertia is required. Ultimately, this again means an unfavorably large and therefore cost-intensive chip.

3. The large gimbal mass that is required for minimizing mechanical overcoupling results in a high sensitivity to external vibrations and shock effects, and therefore, to reduced MEMS sturdiness. A MEMS scanner with a gimbal suspension therefore always represents a compromise between sturdiness and a minimization of overcoupling.

4. In order to generate high levels of torque, the comb electrodes of the electrostatic drive must be attached at a maximum distance from the rotational axis. However, in the case of a gimbal scanner, this causes stator electrode and rotor electrode to leave the area of electrode overlap, even with relatively small scanning angles, and then to transmit only a small amount of power. In principle, an arrangement in which the interelectrode distances are small during the intermittently necessary generation of power and/or torque would be more advantageous.

5. In terms of design, a gimbal MEMS scanner has a plurality of parasitic eigenmodes, which influence the desired set movement more significantly the greater the scanning angles, i.e., actuator deflections, to be achieved, because large scanning angles necessitate long suspension mounts, and long suspension mounts produce more disruptive eigenmodes in the vicinity of the useful oscillation than short suspension mounts. Due to the concertinaed arrangement of two resonators and due to the necessarily large dimensions, the gimbal suspension exhibits an abundance of parasitic modes, in which parts of the outer resonator and parts of the inner resonator are involved in combination. The MEMS designer is therefore always required, despite the less favorable characteristic frequency spectrum, to find a suitable tuning which supplies two useful eigenmodes having the least possible interference for the scanning axes.

6. The consequence of the alternating thermal loads induced by the laser for scanning, particularly in the case of video laser projection, is that the resonance frequency of the MEMS mirror can be shifted within a very short time, resulting in phase and amplitude modifications, and ultimately leading to image defects. In the case of a gimbal scanner, the thermal insulation effect is relatively high, as a result of which heat intake accumulates unfavorably on the thin torsion springs. The reason for this is that two suspension pairs, those of mirror and gimbal, are connected in series before the heat can be released via thermal conduction to the solid chip frame. The problem is generally further intensified by the fact that a fast axis and a slow axis are combined with one another. The slow axis is ordinarily implemented as a very thin, and therefore non-rigid, spring suspension, which impedes the removal of heat. Shorter distances having a larger overall cross-section between mirror plate and chip frame would be more advantageous for avoiding amplitude and phase fluctuations.

The problem addressed by the invention is therefore that of providing a deflection device for a scanner having Lissajous scanning and resonant operation, which minimizes or avoids the above-mentioned problems, and which, despite Lissajous scanning, provides effective image overlap and scanning resolution.

This problem is solved according to the invention by the characterizing features of the main claim in combination with the features of the preamble.

With the measures specified in the dependent claims, advantageous further developments and improvements are possible.

SUMMARY

According to the invention, the deflection device for a scanner with Lissajous scanning comprises a micromirror that oscillates in at least two deflection axes, which has a frame and a mirror plate movably arranged via a suspension mount, and a control device for generating control signals for a resonant operation of the micromirror in the at least two deflection axes, wherein the suspension mount of the mirror plate has at least one spring, which is attached at one end to the mirror plate and at the other end to the stationary frame, and wherein the control frequencies of the control signals for the resonant operation of the micromirror are essentially equal in the at least two deflection axes, and the level thereof is determined by a predefined scanning resolution and a predefined scanning repetition rate, however they differ at least in terms of the predefined scanning repetition rate.

With the present invention, the difficulties of conventional gimbal suspended Lissajous scanners are avoided, because in the simplest case the suspension mount is limited to the mirror plate and the at least one spring, which are attached to the stationary frame. The elimination of a surrounding, movable frame enables a reduction in the dimensions, i.e., the described problem of space is solved. The chip size is then defined almost solely by the requirement for the diameter of the mirror plate, which results from optical boundary conditions, thereby enabling an economical component.

In principle, with the simplest form of the scanner and/or the deflection device, only a single spring can be used for orthogonal scanning, and therefore, the same spring can be used in a deflection or scanning axis as a flexural spring and in the other deflection axis as a torsion spring. Ordinarily, however, poorer performance must then also be accepted. It is therefore preferable for the suspension mount to comprise multiple springs, preferably three, wherein a greater number of springs may also be used, depending upon the application.

The springs are preferably flexural and/or torsion springs, and are preferably embodied as circular path segments around the mirror plate. This also contributes to a saving of space.

More particularly, when a high-quality micromirror is used, for example, having a quality factor of greater than 3,000, the amplitude response thereof has a strong resonance increase, and the corresponding phase response has a strong decrease, i.e., a steep slope. Therefore, such a high-quality micromirror, with a maintained control frequency and/or oscillation frequency, undergoes very substantial changes to its amplitude, even with small resonance frequency-shifts, i.e., such that small temperature changes, for example, are sufficient for bringing the deflection device and/or the micromirror out of resonance. In that case, the control signal with the fixed control frequency would no longer produce an acceleration effect, and would instead produce a deceleration effect. Therefore, in one advantageous embodiment example, the control device has a control loop, which is embodied for controlling the frequency of the control signals of the first and/or the second deflection axis independently of one another, dependent upon the measured phase position of the oscillations of the micromirror, such that the steep phase drop-off and/or the maximum amplitudes of the oscillations are held within the resonance range of the micromirror, i.e., phase and/or amplitude are essentially held constant. Two phase control loops that are independent of one another can also be provided. The control frequencies therefore are not fixed, but are continuously variable. They react to all shifts in the mirror resonance frequencies that occur. The perpetual adaptation of the control frequencies to the instantaneously occurring mirror resonance frequencies results in a Lissajous trajectory that is not closed and is not stationary but traveling, whereby all areas on a projection screen are described with image data, i.e., good image overlap is achieved. It has been found that a temperature-induced phase control is also expedient with micromirrors of lower quality, e.g., greater than 300.

The predefined parameters for the allowable modification range for the amplitude are determined by the properties of the deflection element and by the resolution of the viewing field. For example, the modification range is predefined as the inverse value of the minimum resolution in an axis. With a definition using pixels, the amplitude should preferably change by less than one "pixel width". For example, in the case of a minimal resolution of 480×640 pixels, the amplitude of the deflection element should change by less than 1/480 (0.00283) and 1/640 (0.00146). Preferably, the amplitude should change by less than 1%, more preferably by less than 0.5%, and even more preferably by less than 0.3%.

As was stated above, according to the invention the control frequencies of the control signals for the resonant operation of the micromirror are essentially equal in the two deflection axes, and differ by approximately the predefined scanning repetition rate, i.e., the high resonance frequencies for the two deflection axes are close to one another, and the levels thereof are determined by a predefined resolution and a predefined scanning repetition rate.

The minimum level of the resonance frequency to be selected results for a bidirectional projection display, in which with both forward and backward movement of the mirror oscillation, data are projected as follows, wherein in what follows, the scanning repetition rate is referred to as the image repetition rate, since a laser projection scanner has been selected as the application example:

$f_1$=image repetition rate*(number of lines per image)/ 2+differential frequency $f_2$=image repetition rate*(number of lines per image)/2

A tightened frequency requirement can be formulated, which applies the respectively larger format dimension, in other words, generally the number of pixels per line, rather than the number of lines:

$f_1$=image repetition rate*(number of pixels per line)/ 2+differential frequency $f_2$=image repetition rate*(number of pixels per line)/2

In this, the number of lines and/or pixels is a measurement of image resolution and/or scanning resolution. The image repetition rate is specified as a minimum of 30 Hz, but more expediently as 60 Hz. Ideally, the differential frequency is equal to the image repetition rate. However, because the deflection device of a projection scanner can change its resonance frequency typically by +/−0.1%, dependent upon the incident laser power, it is necessary to track accordingly the frequency of the control signals in both axes, independently of one another, per control loop (phase-lock loop). This more negligible frequency fluctuation can be accounted for in the selection of the suitable resonance frequency by adding double the temperature-dependent frequency bandwidth of the operating range of the deflection device to the minimum value for the resonance frequency, double because in the mathematically least favorable and in practical terms nearly excluded case, the frequency drift of the two axes could possess inverse signs (laser-induced heating, however, will not increase one mode while simultaneously decreasing the other):

$f_1$=image repetition rate*(number of lines per image)/ 2+differential frequency+2*bandwidth $f_2$=image repetition rate*(number of lines per image)/ 2+2*bandwidth.

In concrete terms, for a laser projector scanner having HD1080 resolution (1080 lines per 1920 pixels) and an image repetition rate of 60 Hz, the following minimally required resonance frequency can be calculated:

$f_1$=60 Hz*1080/2+60 Hz+2*0.001*(60 Hz*1080/2+60 Hz)=32525 Hz $f_2$=60 Hz*1080/2+2*0.001*(60 Hz*1080/2)=32465 Hz

The minimum differential frequency would therefore amount to $f_1 - f_2$=60 Hz.

To be on the safe side and to enable a high yield, the designer of the scanner can design a mirror which has a resonance frequency of at least 33 kHz in both axes. The actual problem consists in selecting the proper design such that the two eigenmodes differ from one another by a value that does not deviate too much from 60 Hz. In this case as well, the designer can provide a safety margin by furnishing the detuning of the two eigenmodes with a corresponding addition for safety. This addition is definitively determined by the feasible manufacturing tolerances, and requires a corresponding process qualification. However, the design can then be iteratively optimized until the resonance frequencies of the component exhibit a differential frequency that is just above the desired 60 Hz. In such a process and design optimization, it is possible to achieve fluctuations in the resonance frequencies of less than 0.1%. Contrary to the case involving temperature-induced fluctuations, manufacturing tolerances even with inverse signs can have an effect on the resonance frequencies of the two different axes. In that case, the designer would add double the frequency tolerance to the target frequency:

$f_1$=image repetition rate*(number of lines per image)/ 2+differential frequency+2*temperature induced bandwidth+2*manufacturing tolerance bandwidth $f_2$=image repetition rate*(number of lines per image)/ 2+2*temperature induced bandwidth+2*manufacturing tolerance bandwidth.

The initially identical design of the spring suspension mounts and the selective modification for detuning that is subsequently carried out favor a low number of design iterations for discovering optimal tuning.

In principle, it is also possible to implement tunings in which the resulting differential frequency is substantially higher than the desired 60 Hz. This does not necessarily result in serious image deterioration. With this type of Lissajous projection based upon two very fast deflection axes, in the case of an overly high differential frequency (difference>image repetition rate) within the integration interval of 1/60 second (image repetition rate assumed here) a relatively homogeneously distributed pixel thinning (scanning gaps) occurs. Accordingly, these pixel sites are scanned at a lower repetition rate than 60 Hz; however, due to the diffuse distribution of these sites, this is barely discernible to the eye. This changes when the differential frequency amounts to several kilohertz. In that case, specifically, the blanking intervals occur as larger, contiguous areas, which can be perceived by the human eye as flickering areas. If the designer wishes to allow a higher differential frequency, e.g., 100 Hz, for various reasons, then he can optimally compensate for this by simultaneously designing correspondingly higher resonance frequencies $f_1$ and $f_2$, according to the above calculations.

As was stated above, the differential frequency should advantageously correspond at least or precisely to the scanning repetition frequency; depending upon the object of the deflection device and/or the scanner, a value of between 0.15 and 0.01, e.g., 0.05; 0.03, times the resonance frequency $f_1$ can be chosen as the maximum value for the differential frequency.

In one embodiment example, the drive device has drive electrodes, which are attached to the frame at one end and to the springs and/or the mirror plate at the other end, or the drive device is embodied as a piezoelectric drive, the actuators of which are arranged on the springs. With the stated assemblies, a space-saving configuration can also be provided. With the circular path segments, a compact suspension mount can be provided, and when the electrodes are simultaneously attached to the springs that are attached in a circular pattern around the mirror plate, constantly small interelectrode distances can be ensured, because, for example, comb electrodes are able to engage with one another in the manner of a zipper and always guarantee overlap regions.

The springs are preferably attached to the mirror plate in rotational or mirror symmetry, for example, four springs provided each rotated 90° about the center of the mirror plate, or three springs provided each rotated 120° about the center of the mirror plate. With the symmetrical arrangement, the assignment to the x- and y-axes can be accomplished more easily. For the assignment, the four-arm spring suspension mount has advantages, however, for larger deflection angles, the three-arm spring suspension mount is preferable.

As a result of the direct suspension of the mirror and/or the mirror plate in the chip frame, an advantageous thermal binding with short distances and large spring cross-sections is possible. In this manner, the induced alternating thermal loads can be decreased.

Because a gimbal and/or a gimbal suspension is dispensed with, the restoring moments do not act on a second resonator structure, and instead act directly on the torsionally stiff solid chip frame, and therefore do not supply any problematic, opposite phase resonances of a surrounding resonator. The arrangement always has an extremely favorable eigenmode spectrum, because the undesirable parasitic eigenmodes, which in the case of a gimbal scanner are caused by the gimbal and the coupling thereof to the mirror, do not occur in this case. Thus with the very compact deflection device for the scanner according to the invention, a substantially greater distance from parasitic interference modes can also be generated, because the decreased lateral expansion of the micromirror as compared with a gimbal suspended system and the lower number of oscillating masses and spring elements in a deflection device according to the invention result in an improved distance of parasitic interference modes from the actual useful modes.

Because the entire deflection system can be implemented as much more compact than a comparable gimbal scanner, despite full functionality while dispensing with a gimbal, a very much higher resonance frequency and therefore simultaneously also a greater sturdiness of the deflection system can be achieved as a result of the simultaneously smaller mass to be moved with the same spring stiffness. In addition to the higher resonance frequency, the reduction of parasitic eigenmodes also contributes to the increase in sturdiness.

To generate a complete image within one period of a predefined image repetition or scanning repetition frequency, the resonance frequencies in both deflection axes, which are orthogonal to one another, are predefined for the resonant operation of Lissajous scanning such that two scanning frequencies of nearly identical value are chosen, which satisfy a predefined line-frequency criterion, but which differ in terms of the scanning repetition rate. The line frequency criterion determines that the scanning frequency corresponding to the desired resolution is at least as great as the number of lines to be scanned, multiplied by the scanning or image rate, in other words, in the case of SVGA resolution (600 lines per 800 pixels), this would be 600 lines multiplied by 60 images per second=36000 lines per second. In the case of a bidirectional projection, in which the image data are projected during line movement from left to right, but also in the opposite direction with corresponding movement, the frequency requirement decreases by a factor of 2.

According to the invention, the required, very minimal differentiation between the resonance frequencies can advantageously be achieved in that at least one of the several springs has a spring stiffness that is different from that of the other springs. The different spring stiffness can be determined by a different spring geometry; a change in the spring width by a few micrometers can be sufficient, for example. A person skilled in the art will always be capable of selecting a spring geometry and a selective modification of one of the three spring geometries such that the desired modification, e.g., with respect to the structural width, lies significantly above the manufacturing-based tolerance, such that the desired effect of a resonance frequency shift is not lost in the statistical noise of the manufacturing process. For a mirror plate having four orthogonal springs arranged at 90° angles in relation to one another, a person skilled in the art can preferably modify an opposing pair of springs slightly in relation to the two other springs, in accordance with the invention. As has already been mentioned, this modification can be to the spring width, but also to the spring length. More costly, but equally feasible, is a modification of the thickness or a selective modification of the material properties of the spring.

A further option for adjusting the difference between the two control frequencies involves embodying the moments of inertia of the mirror plates differently in the two deflection axes. For example, the moment of inertia can be modified by means of an elliptical mirror plate, wherein all suspension mounts of the springs can then be identically configured.

The two closely adjacent resonance frequencies result in a Lissajous figure, which can repeat only after a very long time, resulting in a highly effective line density with a suitable selection. Due to the closely adjacent frequencies, large intervals are produced within which no unfavorable frequency response ratios with low line densities exist. Whereas most gimbal scanners are designed with one very slow and one very fast axis, according to the invention, two fast deflection axes are provided. This has the advantage that, in this manner, the speckle problem can be very effectively reduced. Speckles are an undesirable byproduct of projection with coherent laser radiation, and reduce the resolution of the projected image. The sole remedy is to offer the eye as many speckle patterns as possible per unit of time, since these are integrated and averaged in the eye. With two very fast axes and large deflection angles, a very large number of speckle patterns can be generated per unit of time.

In the case of deflection devices for scanners used for measurement purposes, the same calculation rules specified according to the invention apply in principle, however, such cases also involve problems related to measurement engineering, in which the requirements with respect to image repetition rate and/or scanning repetition rate are significantly less stringent due to the potential lack of physiological parameters, such as occur with laser image projection due to the sensitivity of the eye.

BRIEF DESCRIPTION OF THE DRAWINGS

One embodiment example of the invention is illustrated in the set of drawings, and will be specified in greater detail in the following description. The drawings show.

DETAILED DESCRIPTION

Figure 1:
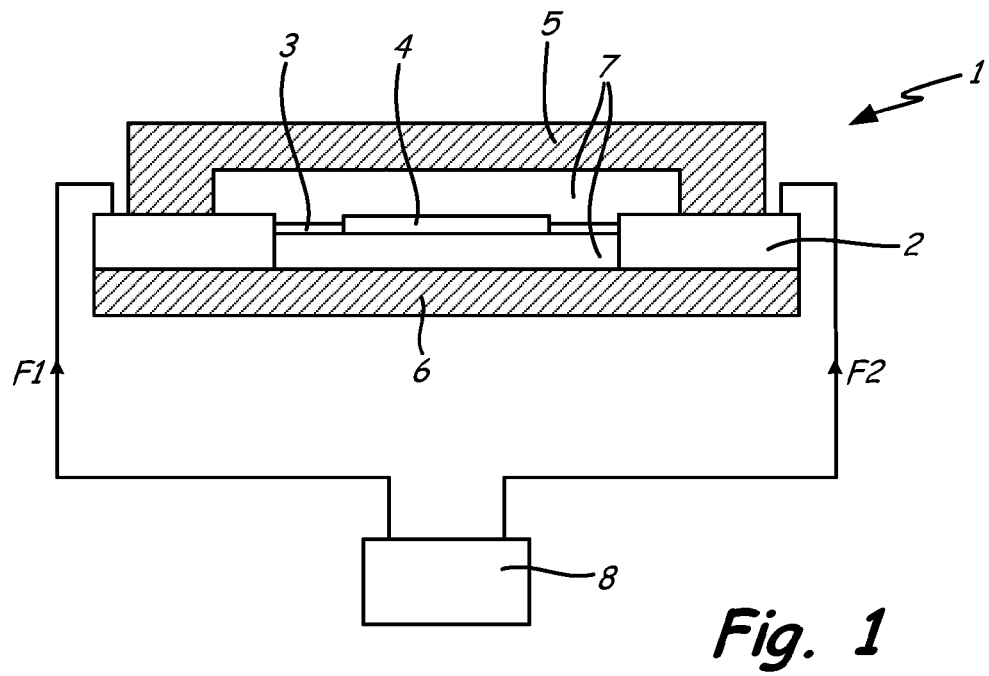
FIG. 1 a schematic design of the deflection device according to the invention.

The deflection device according to the invention illustrated in FIG. 1 for a scanner with Lissajous scanning has a micromirror 1, which comprises a stationary frame 2 and a mirror plate 4 suspended by springs 3. At the front side and the rear side, the chip frame 2 is sealed off by glass plates 5 and 6, respectively, in such a way that a sealed chamber 7 is formed, in which the mirror-plate 4 can oscillate and which preferably is under a vacuum. By means of the suspension mount formed by the springs 3, the mirror plate oscillates in two deflection axes formed orthogonally to one another, wherein the oscillations are generated via stationary, i.e., connected to the frame 2, and movable, i.e., connected to the springs 3 or the mirror plate 4, drive electrodes, which are supplied by a control device 8 with signals of a resonance frequency $f_1$ and a resonance frequency $f_2$. With a resonant micromirror 1 of this type, having the resonance frequencies $f_1$ and $f_2$, when the mirror is irradiated with a beam of light, in one scanning plane the deflected beam will pass through a double-period curve, which is essentially formed as a Lissajous curve. By way of example, reference is made for the drive to an electrostatic drive, in which the movable and stationary drive electrodes engage with one another and generate electrostatic torque.

The control device 8 contains a control loop, which is embodied as a phase-locked loop. When the resonance frequency(ies) is (are) changed, which can occur as a result of an intake of heat, said loop readjusts the phase and therefore the control frequency of the control signals for both axes, independently of one another, such that the deflection device operates with its two deflection axes essentially in resonance. For detecting the phase position, a measurement device (not shown) is provided, which measures the sinusoidal deflection of the mirror plate 4 and the control loop adjusts the frequency of the control signals accordingly.

Figure 2:
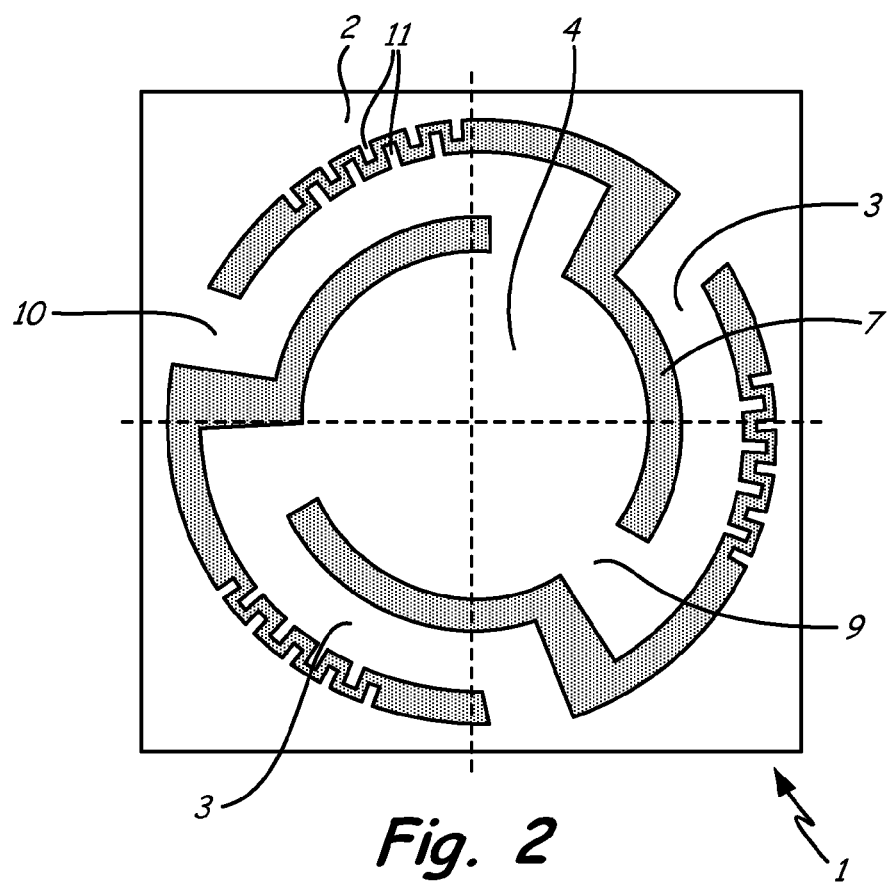
FIG. 2 a schematic plan view of a first embodiment example of the micromirror used according to the invention, FIG. 3 a schematic plan view of a second embodiment example of the micromirror used according to the invention and FIG. 4 a schematic plan view of a third embodiment example of the micromirror used according to the invention.

FIG. 2 shows a schematic plan view of the micromirror 1, in which the suspension mount of the mirror plate 4 is implemented by means of three arcuate springs 3, which are connected at one end 9 to the mirror plate 4 and at the other end 10 to the torsionally stiff, solid chip frame 2. In addition, each of the springs 3 is attached at a position rotated by 120° about the center of the mirror plate 4.

Figure 3:
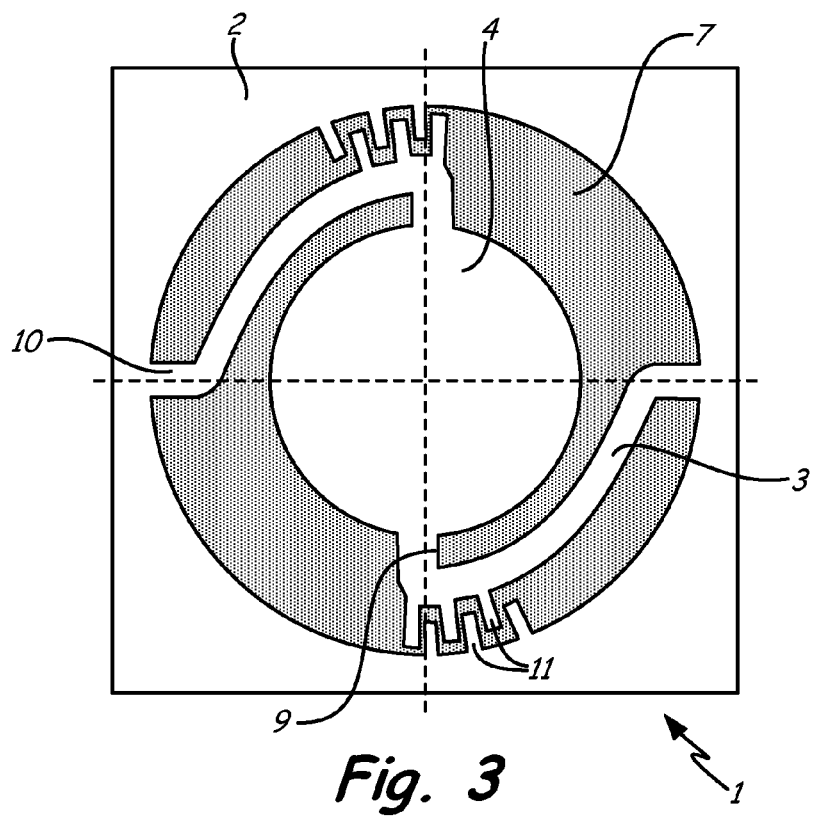

FIG. 3 shows a further embodiment example of a micromirror 1 having a suspension mount comprising two springs 3, otherwise the design is the same as that of FIG. 2.

Figure 4:
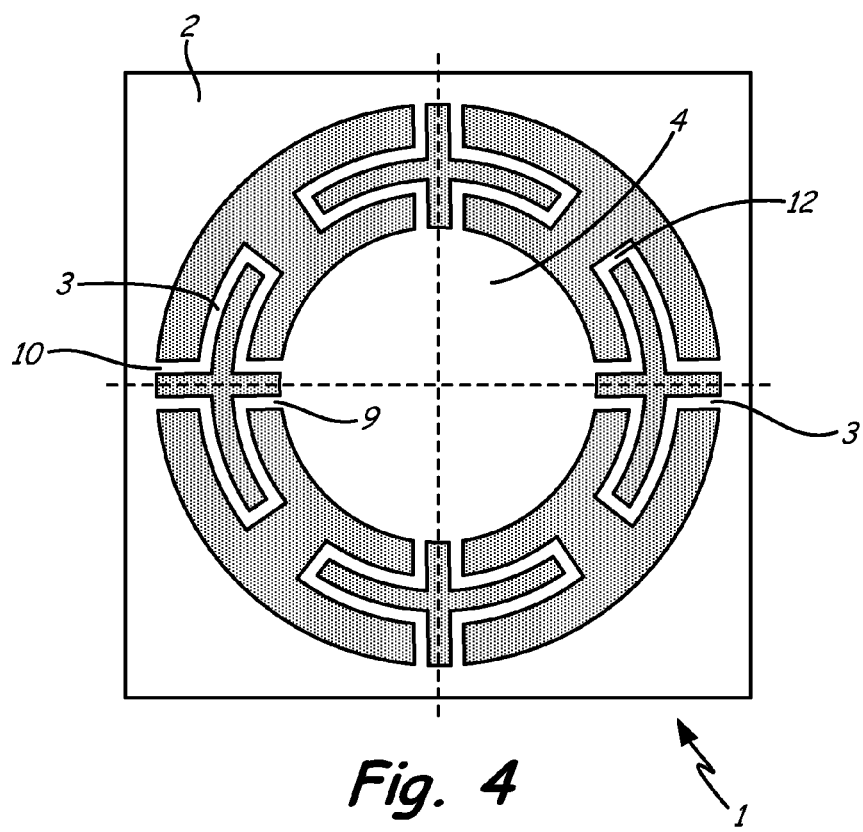

Finally, FIG. 4 shows a micromirror 1 having a four-arm mirror-symmetrical suspension mount. The springs 3 are embodied as double springs for each suspension point, and have a turning point 12, whereby with a small space requirement, very long springs, which are necessary for large deflections, can simultaneously be realized.

Depending upon the drive and/or control signals, the mirror plate 4 oscillates by the excitation and superposition of at least two oscillation modes, and a Lissajous scanning method which is based upon this and which can be used both for video laser projection and for imaging sensor tasks is realized.

As was stated above, the deflection device is used for a scanner with Lissajous scanning, wherein a Lissajous curve is defined by the following equations:

$$x = x_0 \sin(2\pi f_1 t + \phi_0)$$

$$y = y_0 \sin(2\pi f_2 t) \quad (1)$$

In this, t is the time, $\phi_0$ is a constant phase which can be adjusted electronically, and $x_0$ and $y_0$ are the maximum deflections of the scanning curve in the x and y directions, wherein for the further description, $x_0$ and $y_0$ are standardized to 1. The resonance frequencies are predefined by the design, particularly by the springs 3.

A Lissajous curve is known to be periodic when the resonance frequencies $f_1/f_2 = r = p/q$ are a rational number, wherein p and q are whole numbers without common divisors. The period of x is $T1 = 1/f_2$, and the period of y is $T2 = 1/f_2$. Because $T1/T2 = q/p$, $TL = p\,T1 = q\,T2$ is the smallest common period of x and y. In this, TL is the time in which the Lissajous curve repeats. Therefore, the repetition frequency of the Lissajous curve is $$f_L = \frac{1}{T_L} = \frac{f_1}{p} = \frac{f_2}{q}. \quad (2)$$

The number of nodes of the periodic Lissajous curve is q in the x direction and p in the y direction.

For uniform illumination in the case of an image projection using the deflection device and therefore scanning resolution according to the invention, the largest possible number of nodes should be present within the scanning plane. With a predefined resonance frequency $f_2$, this means that q should be the largest possible whole number. Studies have shown that frequency response ratios $f_1/f_2$ of just under 1 are favorable, wherein, however, the resonance frequency $f_1$ cannot be allowed to move too close to the reference frequency $f_2$, as otherwise, the scanning field or image field will not be fully covered. The period TL of the Lissajous figure should not be longer than the time that is available for an image in the case of an image projection, i.e., with an image frequency $f_B$ of 60 Hz, the period TL should be 1/60 at most. The most favorable period is therefore assumed to be when the repetition frequency $f_L$ is equal to the image frequency $f_B$. According to equation (2) then:

$$q=f_2/f_B=600$$

$$p=q-1=599$$

$$f_1=f_2(q-1)/q=f_2-f_B.$$

The above statements relate to idealized circumstances, which still do not account for the fact that temperature-induced and manufacturing-induced fluctuations in the frequencies can occur. Even if a frequency fluctuation of 1% occurs, e.g., based upon temperature fluctuations, good resolution is still available with the specific frequencies $f_1$ and $f_2$.

In the present embodiment example, therefore, a resonance frequency for fluctuations in the one deflection direction of, e.g., 18000 Hz and a resonance frequency in the other deflection direction of 18060 Hz are provided, i.e., the two resonance or control frequencies are nearly identical in height, but differ specifically in terms of the repetition frequency of the Lissajous curve, i.e., in terms of the image repetition rate. Therefore, these resonance frequencies, identified by way of example, are based upon a resolution of 600 lines per 800 pixels (SVGA resolution), and with an image repetition frequency of 60 images per second, a scanning of 36000 lines per second results. When scanning is bidirectional, the frequency requirement is reduced by a factor of 2, and therefore, with the stated example, a minimum line frequency of 18 kHz would be necessary.

With an embodiment example according to FIG. 2, a very slight differentiation in resonance frequencies of this type can be advantageously achieved by selectively modifying at least one of the three spring suspension mounts slightly. For example, the spring width can be modified somewhat. However, the spring length for one spring can also be modified somewhat. It is also conceivable for the thickness of the springs to be differently designed, and even for the material property of one of the springs to be selected as different.

The invention claimed is:

1. A deflection device for a scanner with Lissajous scanning, the deflection device comprising:
a micromirror configured to oscillate in at least two deflection axes, the micromirror including a frame and a mirror plate that is movably arranged by means of a suspension mount, wherein the suspension mount includes at least one spring connected at one end to the mirror plate and at the other end to the frame; and
a control device configured to generate control signals for a resonant operation of the micromirror in the at least two deflection axes, wherein frequencies of the control signals are substantially equal in the at least two deflection axes, wherein a level the frequencies is determined by a predefined scanning resolution and a predefined scanning repetition rate, and wherein the control signals in the at least two deflection axes differ at least in terms of the predefined scanning repetition rate.

2. The deflection device of claim 1, wherein the control device comprises a control loop configured to control the frequency of the control signal for the first and/or the second deflection axis based upon a measured phase position of the oscillations of the micromirror such that a maximum amplitude of the oscillations remains within the resonance range for the micromirror.

3. The deflection device of claim 2, wherein the maximum amplitude of the oscillations changes by less than a reciprocal value of a minimum resolution in the first and/or second deflection axis.

4. The deflection device of claim 1, wherein the suspension mount comprises a plurality of springs.

5. The deflection device of claim 4, wherein the suspension mount comprises three springs.

6. The deflection device of claim 4, wherein a spring stiffness of at least one of the plurality of springs is different from a spring stiffness of the remaining springs.

7. The deflection device of claim 6, wherein at least one of a width, length, thickness and/or material property of the at least one of the plurality of springs is different than that of the remaining springs.

8. The deflection device of claim 4, wherein the springs are configured as circular path segments around the mirror plate.

9. The deflection device of claim 4, wherein the springs are arranged in rotational or mirror symmetry in relation to the mirror plate.

10. The deflection device of claim 1, wherein the at least one spring comprises flexural and/or torsion springs.

11. The deflection device of claim 1, wherein the micromirror is configured such that the moment of inertia of the mirror plate is different in the at least two deflection axes for adjusting any difference between the two control frequencies.

12. The deflection device of claim 11, wherein a geometry of the mirror plate is different with respect to the at least two deflection axes.

13. The deflection device of claim 12, wherein the mirror plate is elliptical.

14. The deflection device of claim 1, wherein the control device further comprises drive electrodes are attached to the springs and/or to the mirror plate.

15. The deflection device of claim 1, wherein the control device comprises a piezoelectric drive unit including actuators arranged on the at least one spring.

16. The deflection device of claim 1, wherein the micromirror is vacuum packaged.

17. The deflection device of claim 16, wherein the micromirror is vacuum packaged at a wafer level.

* * * * *